No. 638,885. Patented Dec. 12, 1899.
G. A. PETERSON & A. OLSON.
ARTIFICIAL BAIT.
(Application filed Sept. 28, 1899.)

(No Model.)

WITNESSES
A. G. Heylmun,
C. G. Heylmun.

INVENTORS.
Gustav A. Peterson, and
Andrew Olson
by Herbert W. T. Jenner.
Attorney

THE NORRIS PETERS CO., PHOTO-LITHO., WASHINGTON, D. C.

United States Patent Office.

GUSTAV A. PETERSON AND ANDREW OLSON, OF FLORENCE, MINNESOTA.

ARTIFICIAL BAIT.

SPECIFICATION forming part of Letters Patent No. 638,885, dated December 12, 1899.

Application filed September 28, 1899. Serial No. 731,915. (No model.)

*To all whom it may concern:*

Be it known that we, GUSTAV A. PETERSON and ANDREW OLSON, citizens of the United States, residing at Florence, in the county of Lyon and State of Minnesota, have invented certain new and useful Improvements in Artificial Bait; and we do hereby declare the following to be a full, clear, and exact description of the invention, such as will enable others skilled in the art to which it appertains to make and use the same.

This invention relates to artificial bait for use in fishing; and it consists in the novel construction and combination of the parts hereinafter fully described and claimed.

Figure 1:
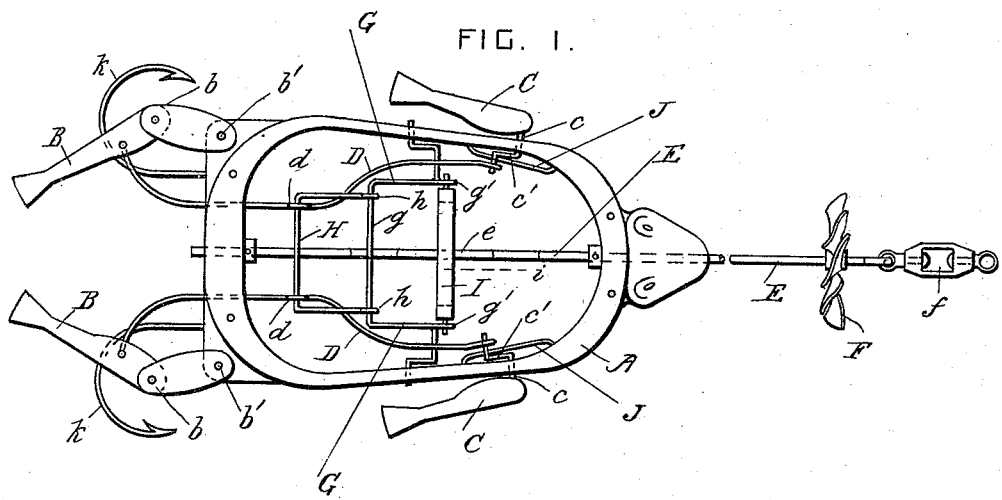
Figure 2:
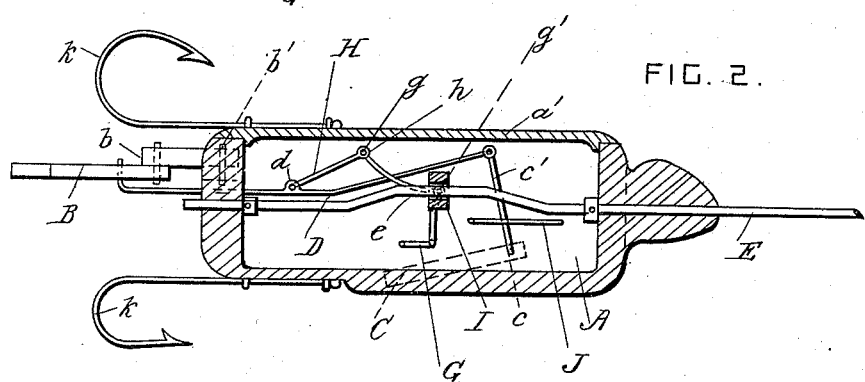
Figure 3:
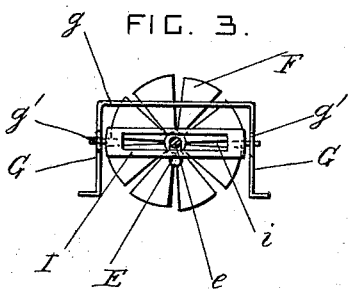

In the drawings, Figure 1 is a plan view of the bait with the cover removed. Fig. 2 is a longitudinal section through the bait. Fig. 3 is a detail end view of the slotted block, crank-shaft, and driving-wheel.

A is a hollow body or box provided with a lid $a'$ and formed so as to represent a frog or a small animal.

B are the hind legs, provided with joints $b$ and articulated to the body A by pins $b'$.

C are the fore legs, provided with pivots $c$, which are pivoted in the sides of the body A and provided with arms $c'$ inside the body.

D are rods which are pivoted to the arms $c'$ at one end and to the rear portions of the hind legs at the other end. These rods constrain the fore legs and hind legs to move simultaneously. The rods D pass through holes in the rear part of the body and are provided with eyes $d$ at their middle parts inside the body.

E is a crank-shaft journaled longitudinally in the body and provided with a crank $e$ inside the body.

F is a driving-wheel secured on the crank-shaft outside the body and which operates to revolve the crank-shaft when the bait is drawn through the water, as in trolling, or when the bait is stationary in a current of water which turns the said wheel. A swivel $f$ is provided for connecting the crank-shaft to the fishing-line, so that the line is not revolved by the driving-wheel.

G are bent levers pivoted at one end to the body and arranged inside it. The other ends of the levers G are connected to a bar $g$.

H is a link which is pivoted in the eyes $d$ of the rods D and is provided with eyes $h$, which are pivoted on the bar $g$. The middle parts of the bent levers G are provided with eyes $g'$.

I is a block pivoted in the eyes $g'$ and provided with a slot $i$, which engages with the crank $e$ of the crank-shaft.

J are guards secured inside the body and keeping the arms $c'$ in position.

Hooks $k$ are attached to the body at appropriate places. By preference two hooks are attached to the under side of the body below the hind legs, and one hook is attached to the middle of the body over the hind legs, so that the three hooks are at the angles of a triangle. The hooks, however, may be attached in any convenient and desirable positions. When the crank-shaft is revolved, the bent levers are oscillated and the rods D are moved back and forth longitudinally, thereby causing the legs to imitate the movements of a frog in swimming and affording a very efficient artificial bait.

What we claim is—

1. In an artificial bait, the combination, with a hollow body portion provided with articulated limbs, of a crank-shaft journaled in the said body portion, a water-wheel secured on the crank-shaft and operating to revolve it when immersed in a current of water or drawn through it, and intermediate mechanism concealed in the said body portion and operatively connecting the said crank-shaft with the limbs, substantially as set forth.

2. In an artificial bait, the combination, with a body portion, and hind legs pivoted thereto; of a crank-shaft journaled in the body portion and provided with means for revolving it, levers pivoted to the body portion, a slotted block pivoted to the said levers and operated by the crank-shaft, and connections between the said levers and the hind legs, substantially as set forth.

3. In an artificial bait, the combination, with a body portion, hind legs pivoted thereto, and fore legs pivoted in the body and having arms projecting from their pivots inside the body; of rods connecting the said hind legs and arms, a crank-shaft journaled in the said body, a water-wheel secured on the crank-shaft and operating to revolve it when immersed in a current of water or drawn through it, and intermediate mechanism operatively connecting the said crank-shaft with the said rods, substantially as set forth.

4. In an artificial bait, the combination, with a body portion provided with articulated limbs, of rods coupling the fore limbs to the hind limbs in pairs, a crank-shaft journaled in the said body and provided with means for revolving it, bent levers pivoted at one end to the body portion, a slotted block pivoted to the middle parts of the said levers and engaging with the crank-shaft, and a connection between the free ends of the said levers and the said rods, substantially as set forth.

In testimony whereof we affix our signatures in presence of two witnesses.

GUSTAV A. PETERSON.
ANDREW OLSON.

Witnesses:
E. J. LYNUM,
E. SMITH.